United States Patent Office 3,636,165
Patented Jan. 18, 1972

3,636,165
INDANOL DERIVATIVES AND PROCESSES FOR PRODUCING SAME
John B. Hall, Oakhurst, N.J., assignor to International Flavors & Fragrances Inc., New York, N.Y.
No Drawing. Filed Aug. 18, 1969, Ser. No. 851,076
Int. Cl. C07c 35/22
U.S. Cl. 260—617 F                        6 Claims

ABSTRACT OF THE DISCLOSURE

Novel hydrogenated indanol derivatives having the formula

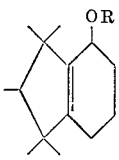

wherein R is hydrogen, alkyl, or acyl; perfume compositions containing such indanols and processes for producing same.

BACKGROUND OF THE INVENTION

There is a continuing need for fragrance materials having persistent woody odors with satisfactory overtones or qualities. While many natural products have woody fragrances, the more desirable of these are frequently in short supply and hence difficult to obtain and expensive. Moreover, it is also desirable that such woody fragrance character have good persistence so that the substances can be used in quality formulations for perfume or other olfactory compositions. Such materials should also possess good blending qualities so that they are useful in preparing perfume compositions.

THE INVENTION

Briefly, the present invention provides novel partially hydrogenated indanol derivatives having the formula:

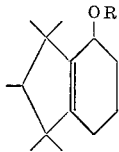

wherein R is hydrogen, alkyl, or acyl. These substances have strong, persistent woody odors with various balsamic overtones. Thus, the present invention also provides novel perfume and fragrance compositions containing such indanol derivatives, and processes for producing such indanol derivatives are also disclosed herein.

More specifically, the preferred indanol derivatives contemplated herein are 4,5,6,7-tetrahydro-1,1,2,3,3-pentamethyl-4-indanol having the formula

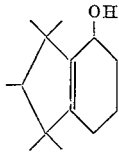

methyl 4,5,6,7-tetrahydro-1,1,2,3,3-pentamethyl-4-indanyl ether having the formula

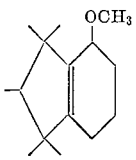

and 4,5,6,7-tetrahydro - 1,1,2,3,3 - pentamethyl - 4 - indanyl acetate having the formula

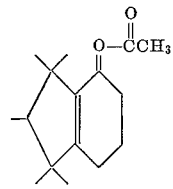

It will be appreciaed by those skilled in the art from the present disclosure that the materials according to this invention can exist in several stereoisomeric forms, and it is contemplated that the formulas given herein include the several isomeric forms.

When R represents alkyl and acyl derivatives, the lower alkyl and lower aliphatic acyl groups are desirable. The alkyl portion of the ether preferably contains from one to four carbon atoms and the ester, aside from the carbonyl carbon atom, preferably contains from one to three carbon atoms.

A convenient starting material according to the present invention is pentamethylindane. The pentamethylindane is hydrogenated to provide the tetrahydroderivative as the first step in the synthesis of the 4-indanols. The double bond is then oxidized with a suitable agent such as peracetic acid to obtain the 3a,7a-epoxyhezahydropentamethylindane which is, in turn, treated with an organoaluminum compound to provide the alcohol. This alcohol can then be suitably treated to obtain ethers and esters.

The hydrogenation is carried out under controlled conditions to add two moles of hydrogen to each mole of the indane. It is preferred to use metallic catalysts such as Raney nickel, palladium, rhodium, platinum, and the like.

Pressures utilized for the hydrogenation are substantially superatmospheric, on the order of from 50 to 200 atmospheres, and it is preferably carried out at from about 60 to about 130 atmospheres. The reaction is desirably carried out at temperatures in excess of 100° C. up to 225° C., and a preferred temperature range is 150° to 190° C.

The 4,5,6,7-tetrahydropentamethylindane so obtained is then oxidized to provide the epoxy oxygen substituent on the 3a,7a bridge. The oxidation is carried out with a percarboxylic acid oxidizer such as peracetic, perpropionic, perbenzoic, and the like. In preferred embodiments of the process, peracetic acid is used, although a combination of acetic anhydride and hydrogen peroxide can also be used. It is also desirable to have an organic salt present, preferably the alkali metal salt of the corresponding carboxylic acid. Thus, sodium acetate would be used with peracetic acid.

This reaction can be carried out at pressures above or below atmospheric, but atmospheric pressure is desired to minimize ebullition of the reactants and provide an acceptable reaction rate, while maintaining control over the reaction. The temperatures used are in the range of 20° to 70° C., and are preferably in the range of from 25-30° C.

The 4-tetrahydroindanol is prepared by treating the epoxyindane with an organoaluminum compound, desirably a trialkoxyaluminum. A preferred trialkoxyaluminum is triisopropoxyaluminum. The reaction can be carried out at, above, or below normal atmospheric pressures, but atmospheric pressure is preferred.

It is desirable to carry out the reaction in an inert reaction vehicle. Aliphatic and aromatic hydrocarbons are desirably used, and a preferred vehicle is an aromatic hydrocarbon such as benzene, toluene, and the like. The reaction is performed at temperatures from about 30° C. to about 140° C., and it is preferred to carry out the reaction under reflux conditions, so the preferred temperature is about 90–115° C.

The alcohol or alcohol derivatives produced according to the above reaction schemes can be separated from the vehicle and any unreacted materials or unwanted by-products removed by conventional means including washing, distillation, crystallization, extraction, preparative chromatography and the like. It is preferred to fractionally distill the washed reaction product under a relatively high vacuum so as to obtain a pure product. Product purities of 80% are readily obtained and much higher purities can also be provided by suitable treatment. All parts, proportions, percentages and ratios herein are by weight unless otherwise indicated.

The pentamethylindanol and derivatives of this invention are useful as fragrances. They can be used singly or in combination to contribute a woody fragrance. As olfactory agents the indanols and indanyl derivatives of this invention can be formulated into or used as components of a "perfume composition."

The term "perfume composition" is used herein to mean a mixture of organic compounds, including, for example, alcohols, aldehydes, ketones, esters and frequently hydrocarbons which are admixed so that the combined odors of the individual components produce a pleasant or desired fragrance. Such perfume compositions usually contain: (a) the main note or the "bouquet" or foundation-stone of the composition; (b) modifiers which round-off and accompany the main note; (c) fixatives which include odorous substances which lend a particular note to the perfume throughout all stages of evaporation, and substances which retard evaporation; and (d) top-notes which are usually low-boiling fresh-smelling materials.

In perfume compositions the individual component will contribute its particular olfactory characteristics, but the overall effect of the perfume composition will be the sum of the effect of each ingredient. Thus, the individual compounds of this invention, or mixtures thereof, can be used to alter the aroma characteristics of a perfume composition, for example, by highlighting or moderating the olfactory reaction contributed by another ingredient in the composition.

The amount of the compounds of this invention which will be effective in perfume compositions depends on many factors, including the other ingredients, their amounts and the effects which are desired. It has been found that perfume compositions containing as little as 2% by weight of compounds or mixtures of compounds of this invention, or even less, can be used to impart a woody odor to soaps, cosmetics, and other products. The amount employed can range up to 7% or higher and will depend on considerations of cost, nature of the end product, the effect desired on the finished product and the particular fragrance sought.

The indanolic derivatives of this invention can be used alone or in a perfume composition as olfactory components in detergents and soaps. space deodorants; perfumes, colognes; bath preparations such as bath oil, bath salts; hair preparations such as lacquers, brilliantines, pomades, and shampoos; cosmetic preparations such as creams, deodorants, hand lotions, sun screens; powders such as talcs, dusting powders, face powder, and the like. When used as an olfactory component of a perfumed article, as little as 0.011% of the novel indane alcohol will suffice to impart a good woody balsamic odor.

In addition, the perfume composition can contain a vehicle or carrier for the other ingredients. The vehicle can be a liquid such as alcohol, glycol, or the like. The carrier can be an absorbent solid such as a gum or components for encapsulating the composition.

It will be appreciated that the pentamethylindanol derivatives according to this invention can be used to enhance, modify, or supplement the fragrance properties of natural or synthetic fragrance compositions. Thus, such indanol and/or indanyl derivatives can be used in fragrance compositions for addition to perfume compositions or directly to products such as soap, detergents, cosmetics, and the like. The fragrance compositions so prepared do not entirely provide the olfactory properties to the finished perfume or other article, but they do furnish a substantial part of the overall fragrance impression.

The following examples are given to illustrate embodiments of the invention as it is presently preferred to practice it. It will be understood that these examples are illustrative, and the invention is not to be considered as restricted hereo except as indicated in the appended claims.

EXAMPLE I (a) Preparation of 4,5,6,7-tetrahydro-1,1,2,3,3-pentamethylindane

The following ingredients are charged into a stainless steel five-liter autoclave equipped with a hydrogen gas feed:

1,800 g. (8.14 moles) of 1,1,2,3,3-pentamethylindane (85% pure)
90 g. of Raney nickel.

Enough hydrogen is fed into the autoclave to raise the pressure to 1,000 p.s.i.g. The hydrogen feed is then continued and the autoclave is heated up to a temperature in the range of 150–185° C. over a period of 8 hours until an amount of hydrogen equal to 10% in excess of theory is absorbed. During this time the pressure in the autoclave is maintained at 1,500 p.s.i.g.

The 1,641 g. of crude product removed from the autoclave is distilled on a 12-inch Goodloe column after being mixed with 10.0 g. of Primol mineral oil. The distillate is recovered in two fractions:

Fraction I: Distills at a temperature of 78–82° C. and 4.0 mm. Hg to provide 401 g. of 4,5,6,7-tetrahydro-1,1,2,3,4-pentamethylindane.

Fraction II: Distills at a temperature of 86–88° C. and 3.5–3.8 mm. Hg to provide 729 g. of hexahydro-1,1,2,3,3-pentamethylindane.

A sample of Fraction I is further refined on a six-foot by ¾ inch gas liquid chromatographic (GLC) column containing 20% Carbowax polyethylene glycol and operated at 110° C. Anaysis by infrared (IR) and proton magnetic resonance (PMR) confirms the structure:

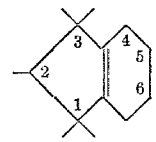

(b) Production of 3a,7a-epoxyhexahydro-1,1,2,3,3-pentamethylindane

Into a 250 ml. flask equipped with thermometer, stirrer, reflux condenser and ice bath are introduced 94 g. of the tetrahydroindane produced above and 15 g. of sodium acetate. At 25° C. to 30° C. 124 g. of 40% peracetic acid (0.65 mole) is added during four hours. After addition is completed an equal volume of water is added to the reaction mass. The aqueous phase is separated from the organic phase and extracted with 150 ml. of toluene. The toluene extract is combined with the organic phase and washed with one volume of 5% aqueous sodium hydroxide solution and then with one volume of water.

The solvent is stripped off leaving a crude product weighing 208 g. The crude epoxy product is distilled on a 12-inch Goodloe column after addition of 4.0 g. of triethanolamine at 72–74° C. and 1.0–1.4 mm. Hg.

(c) Production of 4,5,6,7-tetrahydro-1,1,2,3,3-pentamethyl-4-indanol

Into a 500 ml. flask equipped with reflux condenser, stirrer, thermometer and addition funnel are introduced 250 cc. toluene and 80 g. aluminum triisopropoxide. The mixture is heated to reflux and 90 g. of the epoxyhexahydroindane as produced above is added drop-wise over 1¼ hours at reflux. The reaction mass is further refluxed for 10 hours whereupon it is cooled to 25° C.

The cooled reaction mass is poured into a mixture of 500 g. ice and 200 cc. of 15% sulfuric acid, stirred for 15 minutes, and separated into an aqueous phase and an organic phase. The aqueous phase is extracted with 200 cc. toluene, and the toluene extract is combined with the organic layer. The bulked material is washed with saturated aqueous sodium bicarbonate and twice with 100 cc. of water. The solvent is stripped from the washed organic phase to provide a crude product weighing 71 g.

The crude product is distilled on a 4-inch micro-Vigreux column at a vapor temperature of 105°–107° C. and 2.1–2.4 mm. Hg.

The distillate has a fine balsamic and woody aroma. IR and Raman spectral analysis confirm the following structure:

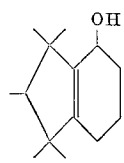

EXAMPLE II

Production of methyl 4,5,6,7-tetrahydro-1,1,2,3,3-pentamethyl-4-indanyl ether

Into a 100 ml. reaction flask equipped with stirrer, thermometer, reflux condenser and heater and nitrogen purge are introduced 2.7 g. of 52.5% sodium hydride and 20.0 g. of dimethyl formamide. While stirring, a solution of 12.0 g. of the indanol produced in Example I is added to the reaction mass over one hour with sufficient cooling so that the temperature does not rise substantially above 50° C. The reaction mass is stirred so as to produce a complete evolution of hydrogen.

After evolution of hydrogen ceases, 7.6 g. of dimethyl sulfate is added with cooling to maintain the temperature at 50° C. for a period of two hours. Then, 40 ml. of water and 10 ml. of toluene are added. The organic layer is separated, and the water layer is extracted with 10 ml. of toluene. The toluene extract is combined with the organic phase and the mixture is washed once with 10 ml. of 5% aqueous hydrochloric acid and twice with 10 ml. of water. The solvent is stripped off to provide a crude ether product weighing 12.0 g.

The crude product is vacuum-distilled. The distillate has a pleasant odor and is shown by IR and PMR analysis to be methyl 4,5,6,7-tetrahydro-1,1,2,3,3-pentamethyl-4-indanyl ether having the structure:

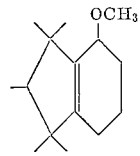

EXAMPLE III

Production of 4,5,6,7-tetrahydro-1,1,2,3,3-pentamethyl 4-indanyl acetate

Into a 10 liter reaction vessel equipped with stirrer, thermometer, and cooling coils are introduced 1,320 g. of the alcohol produced in Example I, 3,600 g. pyridine, and 660 g. acetyl chloride. The reaction mass is stirred for two hours at 50° C. At the end of this period, the reaction mass is poured onto 4,800 g. of ice, and the resulting organic layer is separated from the aqueous phase. The organic phase is washed with 200 g. of 10% aqueous hydrochloric acid, once with a 10% aqueous sodium chloride solution, and then with a 5% sodium carbonate solution to a pH of 9. The washed organic phase is then further washed with a 10% aqueous sodium chloride solution until neutral to litmus.

The solvent is stripped off and the crude ester distilled on a 12-inch Goodloe column.

The resulting product has a pleasing aroma and IR, PMR and mass spectral analysis show it to be 4,5,6,7-tetrahydro-1,1,2,3,3-pentamethyl-4-indanyl acetate having the structure:

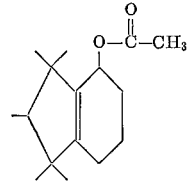

EXAMPLE IV

Preparation of soap compositions

A total of 100 g. of soap chips (from a toilet soap prepared from tallow and coconut oil) is mixed with one gram of the perfume composition given below until a substantially homogeneous composition is obtained. The soap composition manifests a woody balsamic odor.

The perfume composition comprises the following ingredients.

| Ingredient: | Parts |
|---|---|
| Vetivert oil | 40 |
| Alcohol | 60 |
| Sandalwood oil | 100 |
| Rose germanium oil | 200 |
| Musk extract (3%) | 25 |
| Civet extract (3%) | 25 |
| Benzyl iso-eugenol | 100 |
| Coumarin | 100 |
| Heliotropin | 50 |
| Bois de Rose oil | 200 |
| Benzoin resin | 100 |
| | 1,000 |

Similar results are obtained when the mixture of Example I is replaced with the ether of Example II or the acetate of Example III.

EXAMPLE V

Preparation of a detergent composition

A total of 100 g. of a detergent powder is mixed with 0.15 g. of the perfume composition as set forth in Example IV until a substantially homogeneous composition having a balsamic woody odor is obtained.

EXAMPLE VI

Preparation of a cosmetic powder composition

A cosmetic powder is prepared by mixing 100 g. of talcum powder with 0.25 g. of the ketone obtained from the process of Example I in a ball mill. A second cosmetic powder is similarly prepared except that the mixture prepared in Example I is replaced by the ether of Example II. Both cosmetic powders have desirable balsamic woody odors.

EXAMPLE VII

Liquid detergent

Concentrated liquid detergents with a woody balsamic odor are prepared containing 0.1%, 0.15% and 0.20% of the alcohol produced in Example I. They are prepared by adding and homogeneously mixing the appropriate quantity of the compound to Ultra Chemical Company's P-87 liquid detergent.

While the foregoing examples describe the present invention primarily in terms of producing the 4-indanyl compounds, it will be appreciated that the 5-indanyl derivatives can be prepared similarly. Moreover, the compounds of this invention can be prepared by other reaction schemes. As an instance, 1,1,2,3,3-pertamethyl-5-methoxyindane having the formula

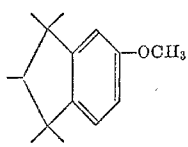

can be treated with lithium in ammonia to provide an unsaturated ketone having the formulas

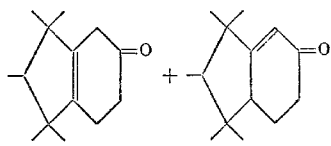

The ketones can then be treated with a reducing agent, desirably a metal hydride such as sodium borohydride or lithium aluminum hydride to provide positionally isomeric alcohols having the formulas

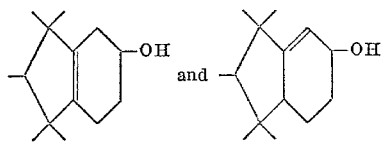

and

Thus, it will be appreciated that the present invention contemplates a variety of hydrogenated indanol derivatives.

What is claimed is:
1. Novel hydrogenated indanol derivatives having the formula

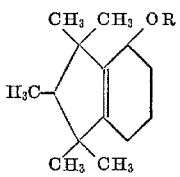

wherein R is hydrogen, lower alkyl or lower acyl.

2. 4,5,6,7-tetrahydro-1,1,2,3,3-pentamethyl-4-indanol.

3. A process for producing 4,5,6,7-tetrahydro-1,1,2,3,3-pentamethyl-4-indanol which comprises reacting 3a,7a-epoxyhexahydro-1,1,2,3,3-pentamethylindane with a trialkoxyaluminum at temperatures from about 30° C. to about 140° C.

4. A process according to claim 3 wherein the alkoxy is isopropoxy.

5. A process according to claim 3 wherein the epoxyindane is produced by reacting 4,5,6,7-tetrahydro-1,1,2,3,3-pentamethylindane with a percarboxylic acid at temperatures in the range of 20° to 70° C.

6. A process according to claim 5 wherein the acid is peracetic acid.

References Cited
Chem. Abst., 69, 58996, 1968.
Chem. Abst., 69, 52524, 1968.
Beilstein, 3rd supplement, Springer-Verlag, New York, 1968, pp. 2427–2428.

HOWARD T. MARS, Primary Examiner

U.S. Cl. X.R.

252—522; 260—488 B, 611 C, 617 C

UNITED STATES PATENT OFFICE
CERTIFICATE OF CORRECTION

Patent No. 3,636,165      Dated January 18, 1972

Inventor(s) JOHN B. HALL

It is certified that error appears in the above-identified patent and that said Letters Patent are hereby corrected as shown below:

Column 2, line 5 of the formula, the double bond between the "O" and hexagon should be changed to a single bond, as follows:

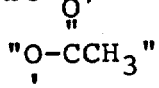

"$\underset{|}{\text{O}}\text{-}\overset{\overset{\text{O}}{\|}}{\text{C}}\text{CH}_3$"

Column 2, line 27, correct the spelling of "hexahydro".

Column 4, line 38, "1,1,2,3,4-pentamethylindane" should read "1,1,2,3,3-pentamethylindane".

Column 5, line 17, "2.1-2.4 mm. Hg." should be "2.1-2.3 mm. Hg."

Signed and sealed this 11th day of July 1972.

(SEAL)
Attest:

EDWARD M. FLETCHER, JR.
Attesting Officer

ROBERT GOTTSCHALK
Commissioner of Patents